UNITED STATES PATENT OFFICE.

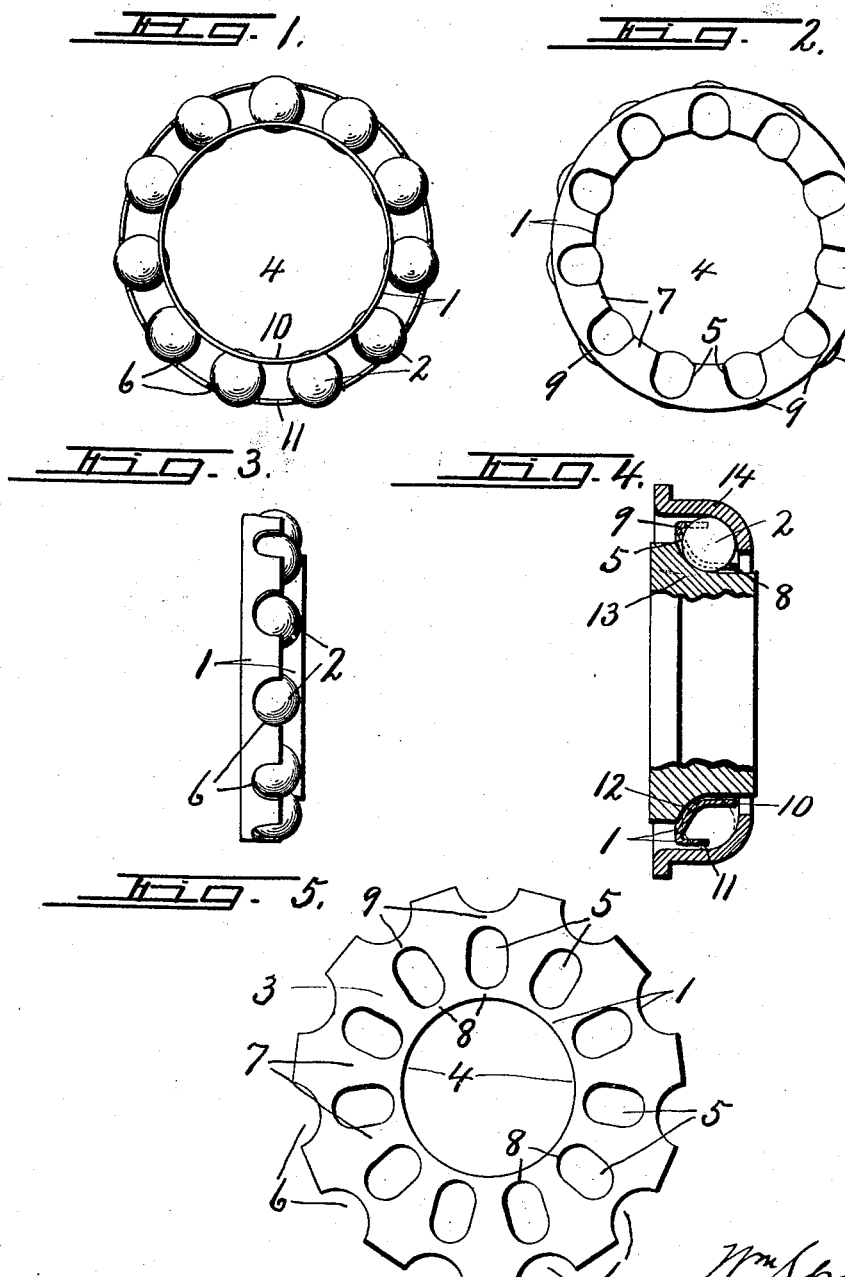

WILLIAM SPARKS, OF JACKSON, MICHIGAN, ASSIGNOR TO THE SPARKS-WITHINGTON COMPANY, OF JACKSON, MICHIGAN, A CORPORATION OF MICHIGAN.

BALL-BEARING.

1,080,081.

Specification of Letters Patent.   Patented Dec. 2, 1913.

Application filed August 26, 1911.   Serial No. 646,206.

*To all whom it may concern:*

Be it known that I, WILLIAM SPARKS, of Jackson, in the county of Jackson, in the State of Michigan, have invented new and useful Improvements in Ball-Bearings, of which the following, taken in connection with the accompanying drawings, is a full, clear, and exact description.

This invention relates to certain improvements in ball bearings and refers more particularly to a ball retainer in which the balls are permanently held uniform distances apart, thereby constituting a unitary article of manufacture capable of being used in connection with any cone and cup bearing where the use of anti-friction balls may be necessary or desirable.

The primary object is to produce a relatively light, strong and durable retainer from a single piece of sheet metal which may be cut, stamped or pressed into the desired form for retaining the balls with a minimum number of operations and at the same time to enable the balls to rotate freely therein with a minimum amount of friction or contact area with the retainer. In other words I have sought to reduce the number of points or area of contact between the balls and retainer and at the same time to position the balls within the retainer in such manner as to constitute a support for said retainer independently of the cone or cups with which the ball bearing is associated.

I am aware that it is common to provide a sheet metal ball retainer with a continuous annular base having one edge provided with radially disposed arms terminating in lateral offsets, the arms and their offsets being disconnected or spaced apart for receiving the balls between them, but in such cases the balls rest in the transversely concaved base and therefore introduce a considerable amount of friction tending to resist the free rotation of the balls, while in my retainer I have sought to obviate this excessive friction by seating the balls in elongated slots or openings in the body of the retainer leaving the retainer at the inner and outer sides of the balls continuous so as to bridge across the openings particularly at the outer side of the balls and thereby firmly bind the portions of the metal between the openings to each other which enables me to use very much lighter sheet metal than would be possible if the portions of the metal between the openings at the outer sides of the balls were disconnected.

In the drawings—Figures 1 and 2 are opposite face views of my improved ball retainer with the balls therein. Fig. 3 is an edge view of the device shown in Figs. 1 and 2. Fig. 4 is a transverse sectional view of the same ball retainer shown as operatively mounted between the cone and cup bearings. Fig. 5 is a plan of the cut sheet metal blank before bending or pressing to the desired form for retaining the balls.

The ball bearing forming the subject matter of this invention comprises a sheet metal ball retainer —1— and a plurality of balls —2— held therein uniform distances apart by suitable spacing members hereinafter described.

The retainer —1— is made from a single plate —3— of sheet metal having a central opening —4— and a series of radially elongated ball openings —5— spaced uniform distances apart circumferentially and of less transverse width than the diameters of the balls —2—, the marginal edge of said plate being provided with a corresponding number of substantially semi-circular recesses —6— in radial alinement with their respective ball openings —5—. The opposite sides of each of the ball openings —5— are preferably parallel leaving intervening radial webs —7— which taper inwardly or rather flare outwardly.

The radial length of each of the bearings —5— is greater than the diameter of the ball which it is adapted to receive but is less than the distance between the inner edge of the retainer plate and base of the adjacent groove or recess —6—, leaving connecting webs —8— and —9— at the inner and outer ends of the openings for connecting the inner and outer ends of the webs —7—, thereby making these portions of the retainer continuous circumferentially.

The transverse width or diameters of the recesses —6— are substantially equal to the transverse widths of their corresponding openings —5— and therefore are of less width than the diameter of the balls which they are adapted to receive so that when the marginal edges of the plate are bent over in a manner hereinafter described, the corners of the outer ends of the webs will serve to retain the balls in their respective openings and at the same time allow portions of the balls to protrude through the recesses.

When the openings —5— and recesses —6— are cut in the metal blank as described, the inner and outer marginal edges of said blank are pressed laterally in the same direction or substantially parallel with the axis as shown more clearly in Figs. 3 and 4, thereby forming what may be termed a hub flange —10— and a peripheral flange —11—.

The peripheral flange —11— is bent or folded over on a circular line substantially coincident with the webs —9—, while the hub flange —10— is bent in the same direction on a circular line between the ends of the ball openings —5—, thereby leaving portions of said openings in the hub. The intermediate portions —12— of the retainer plate between the flanges —10— and —11— are preferably bent inwardly toward the hub at an acute angle with the peripheral flange —11—, thereby forming an obtuse angle with the hub flange —10— which projects axially some distance beyond the corresponding edge of the peripheral flange —11—. It is now clear that the ball openings —5— extend transversely through the intermediate portions —12— and hub portion —10—, thereby allowing the balls to protrude inwardly some distance beyond the inner face of the intermediate portion —12— and to contact only with central points in the sides of the webs —7— at the inner side of the center of the balls.

The distance between the flanges —10— and —11— radially is less than the diameter of the balls and the axial length of the flange —11— is just sufficient to allow the points or corners of the outer ends of the webs —7— to contact with said balls at the opposite sides of their centers, thereby establishing substantially four contact points for each ball, two at the sides of each opening and two at the edges of each recess for retaining the balls in their respective openings against accidental displacement and at the same time leaving the inner and outer portions of the balls free to contact with suitable bearings, as for example, a cone —13— and cup —14—, Fig. 4.

As previously intimated, the intermediate portion —12— of the retainer is disposed at an angle to its axis while the space between the edges of the flanges —10— and —11— is directly opposite the deflected intermediate portion —12— so that the balls protrude inwardly beyond said intermediate portions —12— and outwardly beyond the edge of the peripheral flange —11— and the contact points of each ball are therefore disposed in a diametrical line through the ball at substantially right angles to the intermediate portion of the retainer. This provision for the projection of the balls inwardly and outwardly beyond the flanges —10— and —11— respectively leaves the retainer free from contact with either the cone —13— or cup —14—, thus permitting the retainer to be supported entirely by the balls to serve the double purpose of holding the balls uniform distances apart and also to reduce friction upon said balls to a minimum.

The operation of my invention will now be readily understood with reference to the foregoing description and the accompanying drawing and while I have shown and described the retainer as supported exclusively by the balls out of contact with either the cone —13— or cup —14—, it is evident that in some instances I may prefer to fasten portions of the retainer to either the cone or cup and therefore I do not wish to limit myself to the precise construction and arrangement shown and described.

What I claim is:

1. In a ball bearing, a ball retainer comprising a plate having a central opening and inner and outer concentric flanges projecting axially different distances in the same direction from the main body, said main body being disposed at an angle to said axis and provided with ball-openings of greater length but of less width than the diameters of the balls which they are adapted to receive, and balls in said openings, the outer flange having recesses in its edge also receiving portions of the balls.

2. In a ball bearing, a ball retainer and balls therein, said retainer comprising a sheet metal plate having a central opening and inner and outer concentric flanges projecting in the same direction substantially parallel with the axis, the outer flange being somewhat shorter axially than the inner flange and spaced apart therefrom a distance less than the diameter of the balls and having its edge provided with recesses of less circumferential width than the diameter of the balls, the portions of the retainer between said flanges being provided with radial ball-openings of less circumferential width than the diameter of the balls and alined radially with the recesses.

In witness whereof I have hereunto set my hand on this fourth day of August 1911.

WILLIAM SPARKS

Witnesses:
LILLIAN WUNDERLICH,
BEULAH B. SKINNER.